United States Patent
Jackson, Jr.

(10) Patent No.: US 9,834,231 B2
(45) Date of Patent: Dec. 5, 2017

(54) FLEXIBLE WALL AND COMPRESSION CORE ASSEMBLIES AS WELL AS GAS SPRING ASSEMBLIES AND METHODS INCLUDING SAME

(71) Applicant: Firestone Industrial Products Company, LLC, Indianapolis, IN (US)

(72) Inventor: David D. Jackson, Jr., Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 14/055,492

(22) Filed: Oct. 16, 2013

(65) Prior Publication Data
US 2014/0175717 A1    Jun. 26, 2014

Related U.S. Application Data

(60) Provisional application No. 61/715,278, filed on Oct. 17, 2012.

(51) Int. Cl.
*B61F 5/10* (2006.01)
*F16F 9/04* (2006.01)
*B21D 53/88* (2006.01)

(52) U.S. Cl.
CPC ............... *B61F 5/10* (2013.01); *B21D 53/88* (2013.01); *F16F 9/0454* (2013.01); *Y10T 29/49611* (2015.01)

(58) Field of Classification Search
CPC .... F16F 9/05; F16F 9/0454; B60G 2202/424; B60G 2204/126; B60G 2206/424
USPC ......... 267/64.27, 64.24, 64.21, 64.23, 64.19, 267/64.28, 122; 29/896.91
See application file for complete search history.

(56) References Cited

U.S. PATENT DOCUMENTS

| | | | | |
|---|---|---|---|---|
| 2,922,637 | A * | 1/1960 | Bowser | F16F 9/0454 152/396 |
| 2,977,134 | A * | 3/1961 | Helling | B60G 17/0485 267/64.21 |
| 3,895,787 | A * | 7/1975 | Niehus | B61F 5/10 105/198.1 |
| 4,899,995 | A * | 2/1990 | Hoffman | F16F 9/0463 267/64.24 |
| 6,361,028 | B1 * | 3/2002 | Hubbell | F16F 9/0409 267/64.19 |
| 6,382,602 | B1 * | 5/2002 | Morrow | B60G 11/26 267/122 |

(Continued)

*Primary Examiner* — Robert A Siconolfi
*Assistant Examiner* — San Aung
(74) *Attorney, Agent, or Firm* — Brian D. McAlhaney; Fay Sharpe LLP (57) ABSTRACT

An assembly includes a flexible wall, that can at least partially define a spring chamber for containing pressurized gas. The flexible wall can include at least one mounting bead formed along an end thereof. A compression core can be disposed along the exterior of the flexible wall in abutting engagement with the mounting bead. The compression core can be captured between the mounting bead and a portion of the flexible wall such that inflation of the spring chamber biases the flexible wall, mounting bead and compression core outward and into engagement with an end member to form a gas spring assembly. A suspension system and a method of assembly are also included.

20 Claims, 10 Drawing Sheets

(56) References Cited

U.S. PATENT DOCUMENTS

| | | | |
|---|---|---|---|
| 8,038,131 B1 * | 10/2011 | Lin | B60G 15/12 267/122 |
| 2003/0116898 A1 * | 6/2003 | Leonard | F16F 9/0445 267/64.27 |
| 2006/0273501 A1 * | 12/2006 | Taylor | F16F 9/05 267/64.27 |

* cited by examiner

FLEXIBLE WALL AND COMPRESSION CORE ASSEMBLIES AS WELL AS GAS SPRING ASSEMBLIES AND METHODS INCLUDING SAME

This application claims priority from U.S. Provisional Patent Application No. 61/715,278 filed on Oct. 17, 2012, which is hereby incorporated herein by reference in its entirety.

BACKGROUND

The subject matter of the present disclosure broadly relates to the art of spring devices and, more particularly, to flexible wall and compression core assemblies configured for use in forming gas spring assemblies dimensioned for use in rail applications as well as methods of assembling such gas spring assemblies. Suspension systems for rail vehicles that include one or more of such rail spring assemblies are also included.

The subject matter of the present disclosure is capable of broad application and use in connection with a variety of applications and/or environments. However, the subject matter finds particular application and use in conjunction with rail vehicles, and will be described herein with particular reference thereto. As such, it is to be appreciated that the subject matter of the present disclosure is amenable to use in connection with other applications and environments, such as gas spring assemblies dimensioned for use in motorized vehicle applications, for example, without departing from the subject matter of the present disclosure.

A suspension system, such as may be used in connection with motorized rail vehicles and/or rolling-stock rail vehicles, for example, can include one or more spring elements for accommodating forces and loads associated with the operation and use of the corresponding device (e.g., a motorized vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Additionally, end members of conventional rail spring assemblies are often constructed to withstand forces and loads acting on the rail spring assembly that are transmitted to, from and/or between the opposing structural members of an associated rail vehicle. As such, conventional rail spring end members are often constructed of metal materials and are designed to withstand conditions (e.g., exposure to outdoor weather conditions) associated with use in operation during over-the-rail travel and/or under similar environments, such as impacts from foreign objects and/or the collection of dirt and debris. In some cases, however, it may be desirable to reduce the overall weight of a suspension system. Reducing the weight of the end members of the one or more rail spring assemblies could be one contributing factor to achieving such a goal.

Notwithstanding the widespread usage and overall success of the wide variety of end member designs that are known in the art, it is believed that a need exists to meet these competing goals while still retaining comparable or improved performance, ease of manufacture, ease of assembly, ease of installation and/or reduced cost of manufacture, without adversely affecting the strength, rigidity, robustness and/or overall integrity of the rail spring assembly.

BRIEF SUMMARY

One example of a flexible wall and compression core assembly in accordance with the subject matter of the present disclosure can be dimensioned for securement along an associated end member of an associated gas spring assembly. The flexible wall and compression core assembly can include a flexible wall having a longitudinal axis and extending peripherally about the axis and longitudinally between opposing first and second ends. The flexible wall can include a first mounting bead formed along the first end. The flexible wall and first mounting bead can be at least partially formed from a first elastomeric material. A reinforcing element can extend peripherally about the axis and can be embedded within the first mounting bead of the flexible wall. A compression core can be disposed between the first mounting bead and a portion of the flexible wall adjacent the first mounting bead. The compression core can be formed from at least one of a metal material, a polymeric material and a second elastomeric material that is different from the first elastomeric material such that the compression core is one of comparatively more rigid and of comparatively greater hardness than the elastomeric material of the flexible wall and the first mounting bead.

One example of a rail spring assembly in accordance with the subject matter of the present disclosure can having a longitudinal axis and can be dimensioned for securement between associated sprung and unspring masses. The rail spring assembly can include a first end member and a second end member. The first end member can include an end wall disposed transverse to the longitudinal axis and a side wall extending from along the end wall. The side wall can include an inner peripheral surface. The second end member can be disposed in longitudinally-spaced relation to the first end member. A flexible wall that is at least partially formed from a first elastomeric material can extend peripherally about the longitudinal axis and axially between opposing first and second ends to at least partially define a spring chamber. The first end of the flexible wall can include a first mounting bead formed therealong. The first mounting bead can be disposed along the inner peripheral surface of the first end member such that a substantially fluid-tight seal is formed therebetween. The second end can be operatively connected to the second end member such that a substantially fluid-tight seal is formed therebetween. A first reinforcing element can extend peripherally about the axis and can be embedded within the first mounting bead of the flexible wall. A first compression core can be disposed between the first mounting bead and a first portion of the flexible wall adjacent the first mounting bead. The compression core can be formed from at least one of a metal material, a polymeric material and a second elastomeric material that is different from the first elastomeric material.

One example of a suspension system in accordance with the subject matter of the present disclosure can include a pressurized gas system and at least one rail spring assembly in accordance with the foregoing paragraph. The spring chamber of the at least one rail spring assembly can be disposed in fluid communication with the pressurized gas system such that pressurized gas can be transferred into and out of the spring chamber.

One example of a method of assembling a rail spring in accordance with the subject matter of the present disclosure can include providing a flexible wall that has a longitudinal axis and extends peripherally about the longitudinal axis and axially between opposing first and second ends. The flexible wall can at least partially define a spring chamber and the flexible wall can include a first mounting bead disposed along the first end. The method can also include providing a compression core and positioning the compression core along the exterior of the flexible wall in abutting engagement with the first mounting bead. The method can further include providing a first end member having an inner surface, and positioning the first mounting bead and the compression core adjacent the inner surface of the first end member. The method can also include urging the first mounting bead and the compression core into abutting engagement with the inner surface and thereby at least partially securing the first end member along the first end of the flexible wall. The method can further include providing a second end member and securing the second end member along the second end of the flexible wall.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
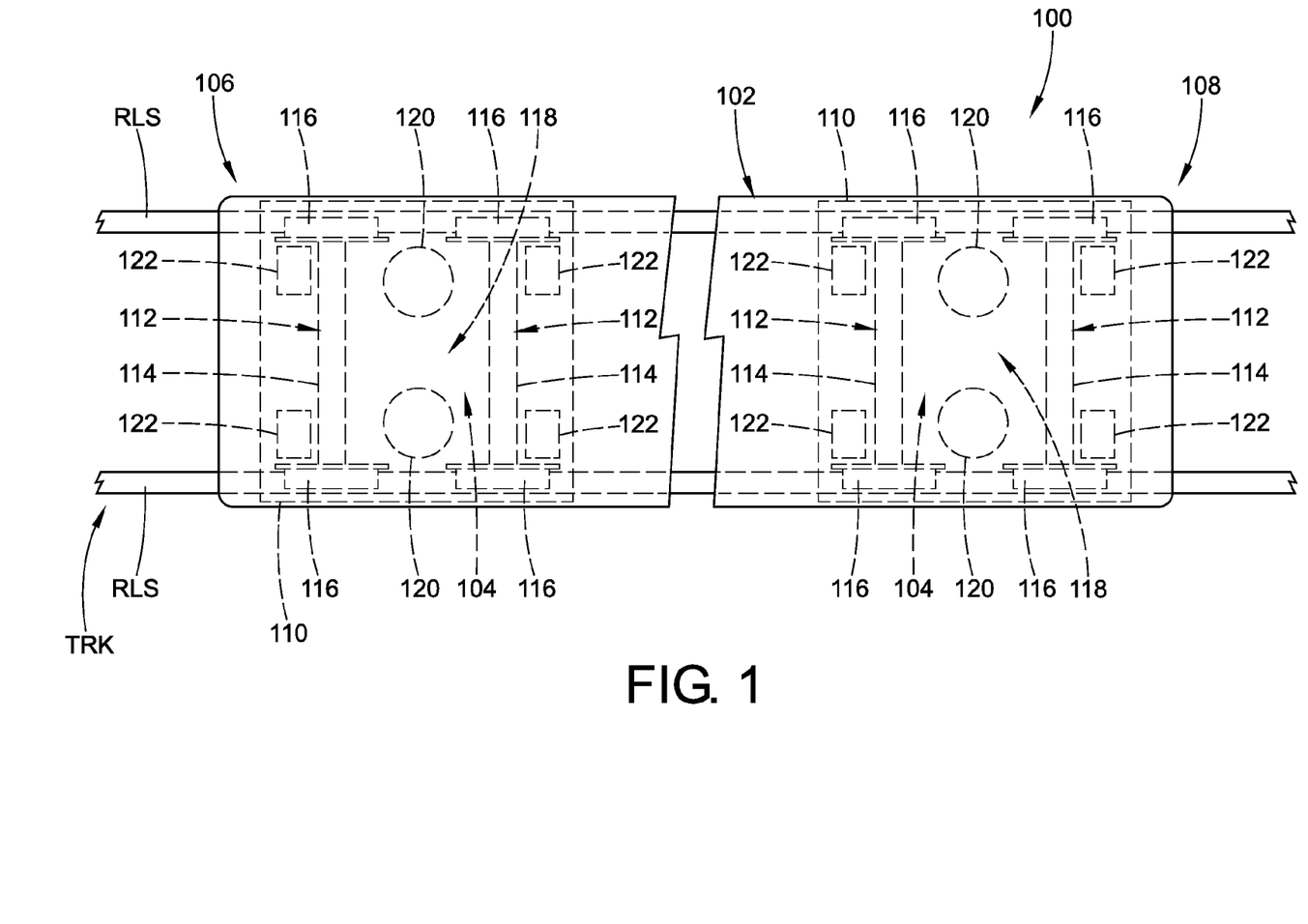
FIG. 1 is a schematic representation of one example of a rail vehicle including a suspension system in accordance with the subject matter of the present disclosure.

FIG. 1 illustrates one example of a vehicle including a suspension system in accordance with the subject matter of the present disclosure, such as a rail vehicle 100 that is adapted for movement or is otherwise displaceable along a track TRK that is at least partially formed by rails RLS of an indefinite length. It will be appreciated that the subject matter of the present disclosure is broadly applicable for use in a wide variety of applications, and that use in connection with rail vehicle 100 merely represents one example of a suitable application. Rail vehicle 100 is shown being representative of rolling stock (e.g., a railcar) rather than an engine or traction drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Bogies 104 are shown in FIG. 1 as including a frame 110 as well as one or more wheel sets 112 that are typically formed by an axle 114 and a pair of spaced-apart wheels 116. Normally, bogies 104 include at least two wheel sets, such as is shown in FIG. 1, for example, that are operatively connected to the frame in manner suitable for permitting the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one gas spring assembly of a type commonly referred to in the art as a "rail spring assembly" or simply a "rail spring". In the exemplary arrangement shown in FIGS. 1 and 2, bogies 104 include two rail or gas spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIG. 1, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 2:
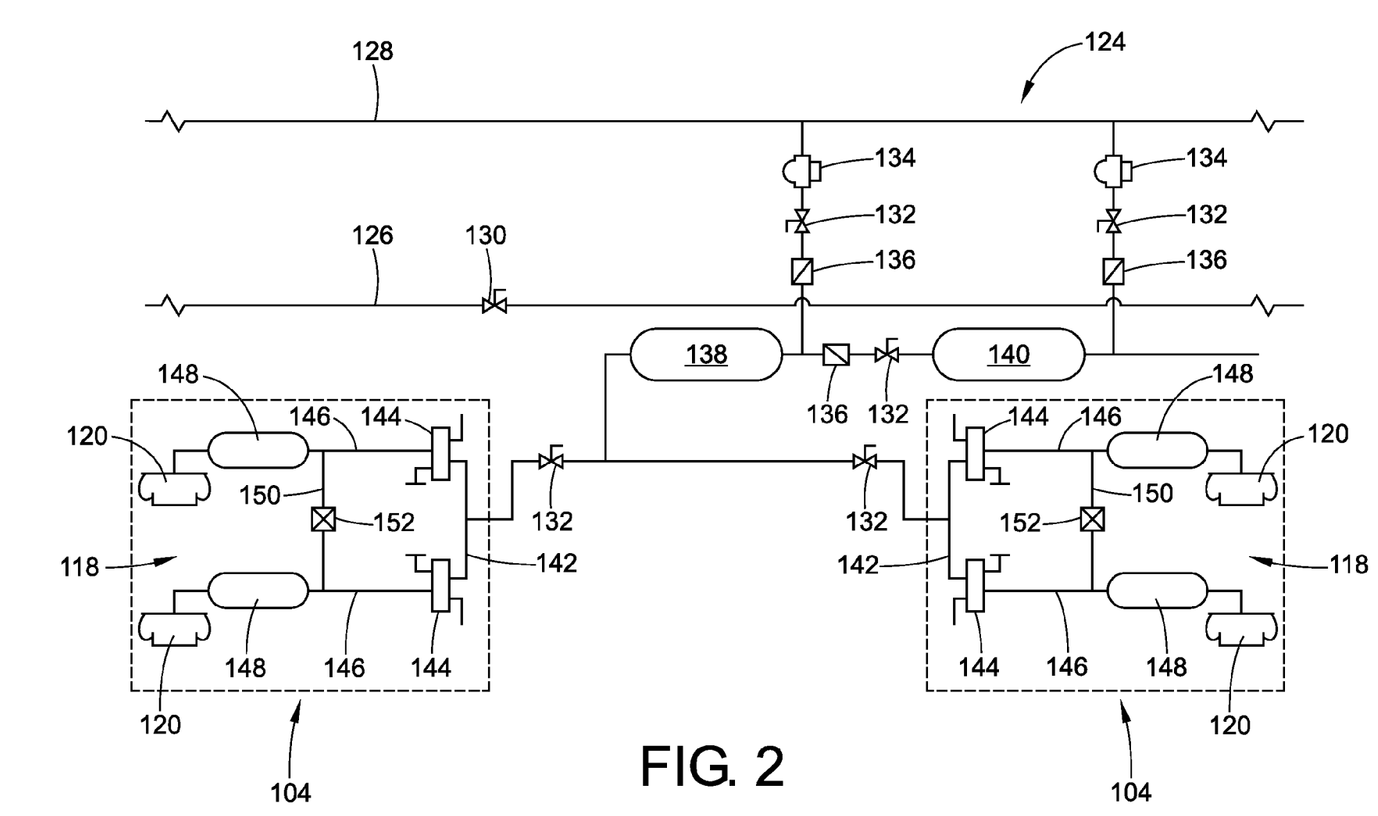
FIG. 2 is a schematic representation of one example of a pneumatic system operatively associated with the suspension system in FIG. 1.
Figure 3:
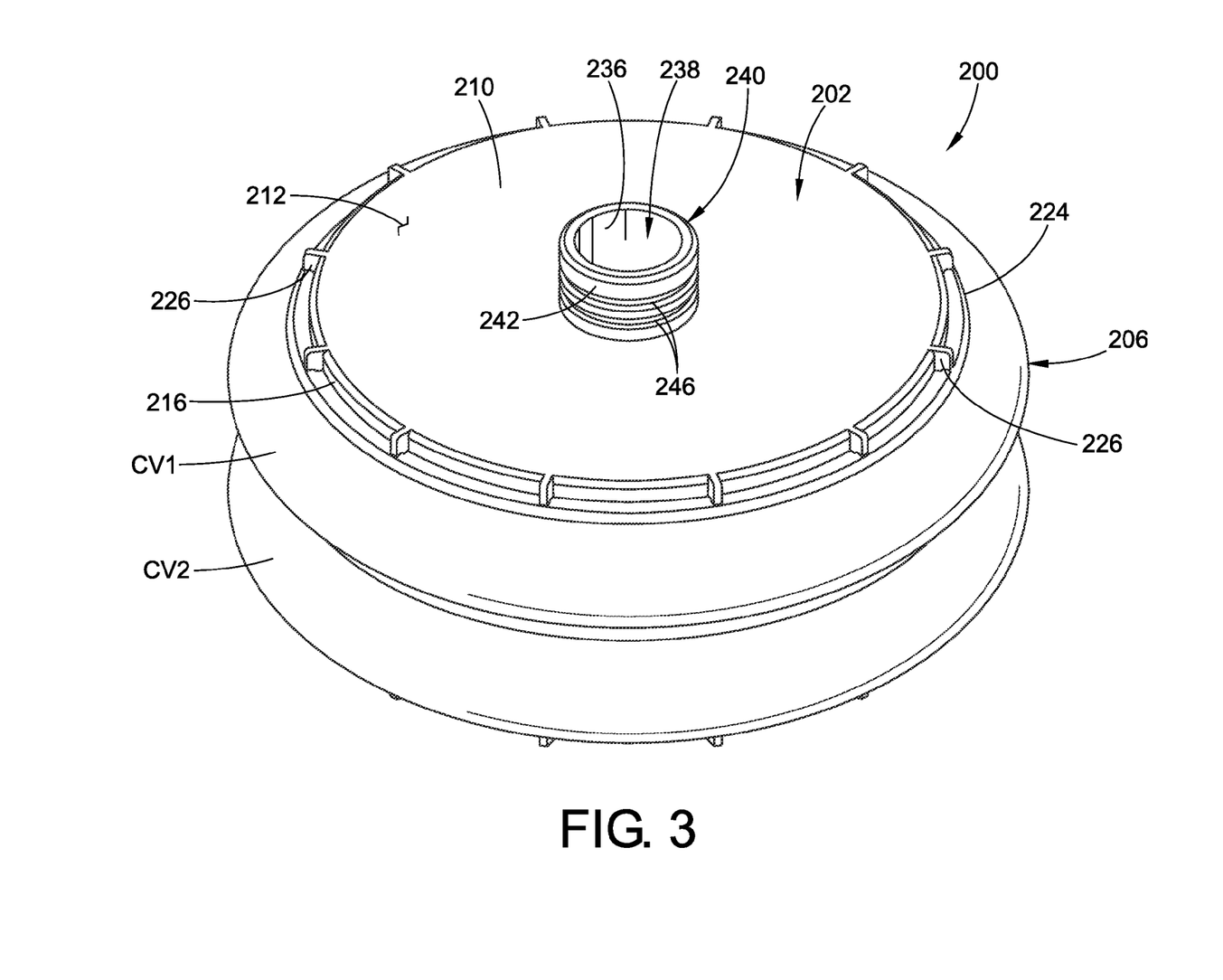
FIG. 3 is a top perspective view of one example of a gas spring assembly in accordance with the subject matter of the present disclosure.

FIG. 2 illustrates one example of a pneumatic system 124 that is operatively associated with rail vehicle 100 and includes a braking system (not numbered) with a brake pipe 126 in fluid communication with at least brakes 122 (FIG. 1) and a pneumatic supply system (not numbered) with a supply pipe 128 in fluid communication with at least gas spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 2, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as the auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas lines 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 2, for example.

One example of a gas spring assembly in accordance with the subject matter of the present disclosure, such as may be suitable for use as one or more of gas spring assemblies 120 in FIGS. 1 and 2, for example, is shown as gas spring assembly 200 in FIGS. 3-9. The gas spring assembly has a longitudinal axis AX and includes an end member 202, an end member 204 spaced longitudinally from end member 202 and a flexible wall 206 that extends peripherally about the longitudinal axis and is secured between the end members to at least partially define a spring chamber 208.

Figure 5:
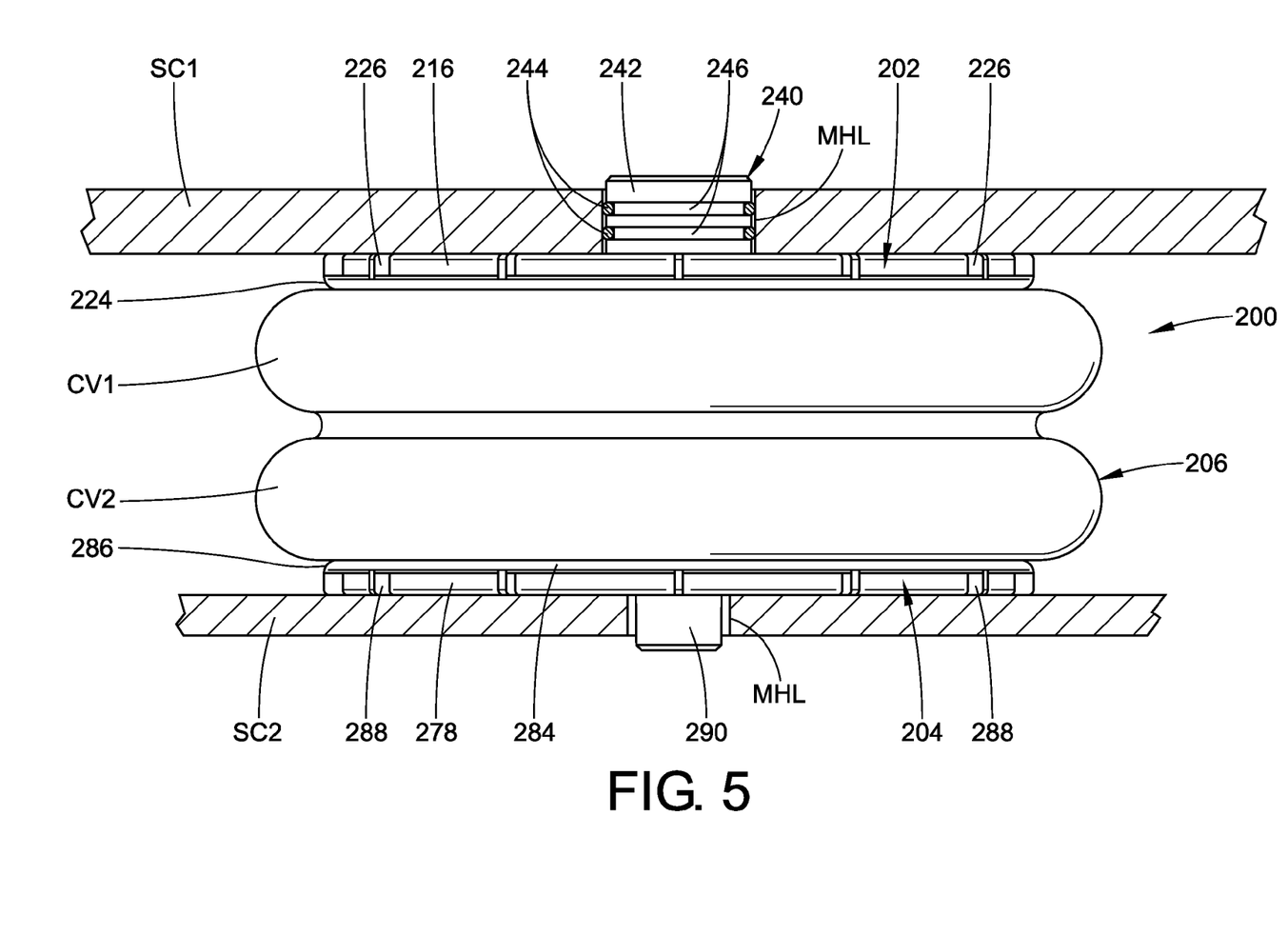
FIG. 5 is a side elevation view of the exemplary gas spring assembly in FIGS. 3 and 4.

Gas spring assembly 200 can be disposed between associated sprung and unsprung masses of an associated vehicle in any suitable manner. For example, one end member can be operatively connected to an associated sprung mass with the other end member disposed toward and operatively connected to the associated unsprung mass. As shown in FIG. 5, for example, end member 202 can be disposed on or along a structural component SC1, such as an associated vehicle body 102 in FIG. 1, for example, and can be secured thereon in any suitable manner. As another example, end member 204 can be disposed on or along a structural component SC2, such as an associated rail bogie 104 in FIG. 1, for example, and can be secured thereon in any suitable manner.

In the exemplary arrangement in FIGS. 3-8, end member 202 is shown as taking the form of an end cap including a plate wall 210 that has an outer surface 212 and an inner surface 214 such that a plate height (not identified) is at least partially defined therebetween. Plate wall 210 is shown as being generally planar and extending outwardly to an outer side wall (or outer side wall portion) 216 that has an outer surface 218 and an inner surface 220. In some cases, plate wall 210 can have a generally circular shape such that an outer peripheral wall portion 222 can extend radially-outwardly from along outer side wall 216 to an outer peripheral edge 224. In some cases, a plurality of support walls 226 can project radially outward from along outer surface 218 of outer side wall 216 and interconnect with outer peripheral wall portion 222, such as adjacent outer peripheral edge 224, for example. It will be appreciated that outer peripheral wall portion 222 can, in some cases, be spaced axially from plate wall 210, and can include an end surface 228 that can, in some cases, form a distal extent of at least the outer periphery of end member 202.

Figure 8:
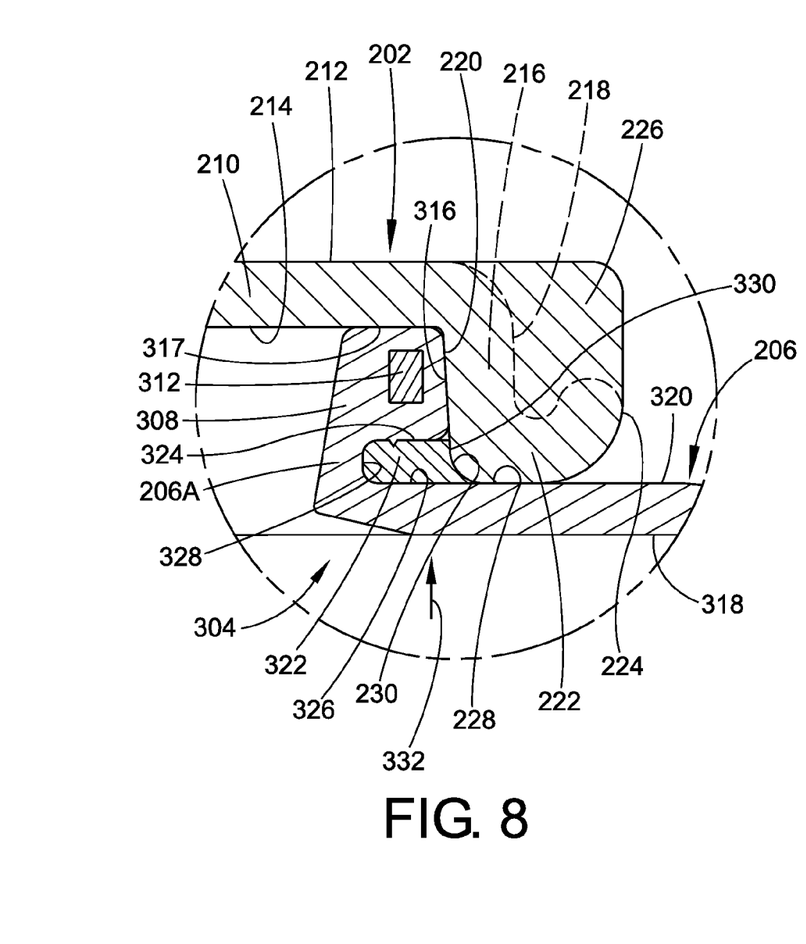
FIG. 8 is an enlarged view of the portion of the exemplary gas spring assembly in FIGS. 3-7 identified as Detail 8 in FIG. 7.
Figure 9:
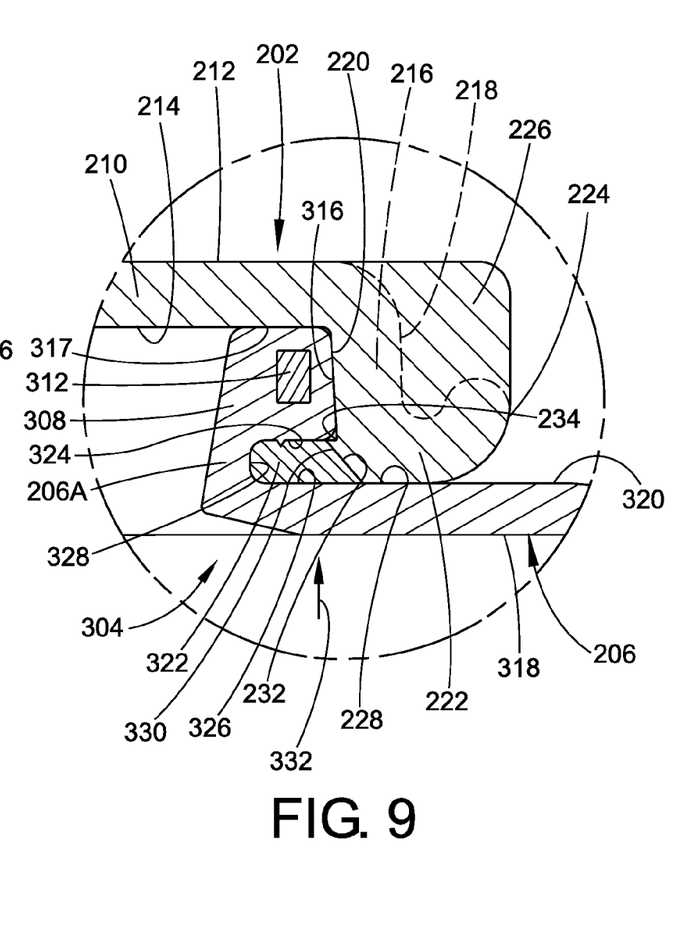
FIG. 9 is an enlarged view of an alternate configuration of the portion illustrated in FIG. 8 of the exemplary gas spring assembly in FIGS. 3-7.

Additionally, it will be appreciated that inner surface 220 can transition to end surface 228 in any suitable manner. As one example, a shoulder surface 230 having a curved cross-sectional profile can extend between the inner surface and the end surface, such as is illustrated in FIG. 8, for example. As another example, a surface 232 can extend from along end surface 228 and can have an approximately linear cross-sectional profile. Surface 232 can extend radially inward at an angle from end surface 228 such that surface 232 can have a tapered or frustoconical shape, such as is shown in FIG. 9, for example. Additionally, a shoulder surface 234 can, optionally, extend between inner surface 220 and surface 232. In some cases, shoulder surface 234 can be disposed transverse to inner surface 220 and can at least partially form an annular ridge or projection (not numbered) that is dimensioned to engage and/or otherwise at least partially retain flexible wall 206 in abutting engagement with end member 202.

In some cases, end member 202 can include a passage surface 236 that at least partially defines a gas transfer passage 238 extending through the end member such that pressurized gas can be transferred into and out of spring chamber 208, such as by way of pneumatic system 124 (FIG. 2) for example. In some cases, the end member can include a projection or boss 240 that extends from along plate wall 210, such as from along outer surface 212 and in a longitudinal direction away from end member 204, for example.

As mentioned above, one or more securement devices (not shown) can be used to secure or otherwise interconnect the end members of the gas spring assembly with corresponding structural components. In some cases, projection 240 can include an outer surface 242 that is dimensioned for receipt within a passage or mounting hole MHL that extends through structural component SC1. Additionally, one or more sealing elements 244 can, optionally, be included that are disposed between or otherwise at least partially form a substantially fluid-tight connection between the end member and the structural component, such as between projection 240 and mounting hole MHL, for example. In some cases, one or more radially inwardly extending grooves 246 could be formed on or along projection 240, and can be dimensioned to at least partially receive one of sealing elements 244. Additionally, in some cases, structural component SC1 can, optionally, at least partially define an external reservoir suitable for storing a quantity of pressurized gas.

Figure 4:
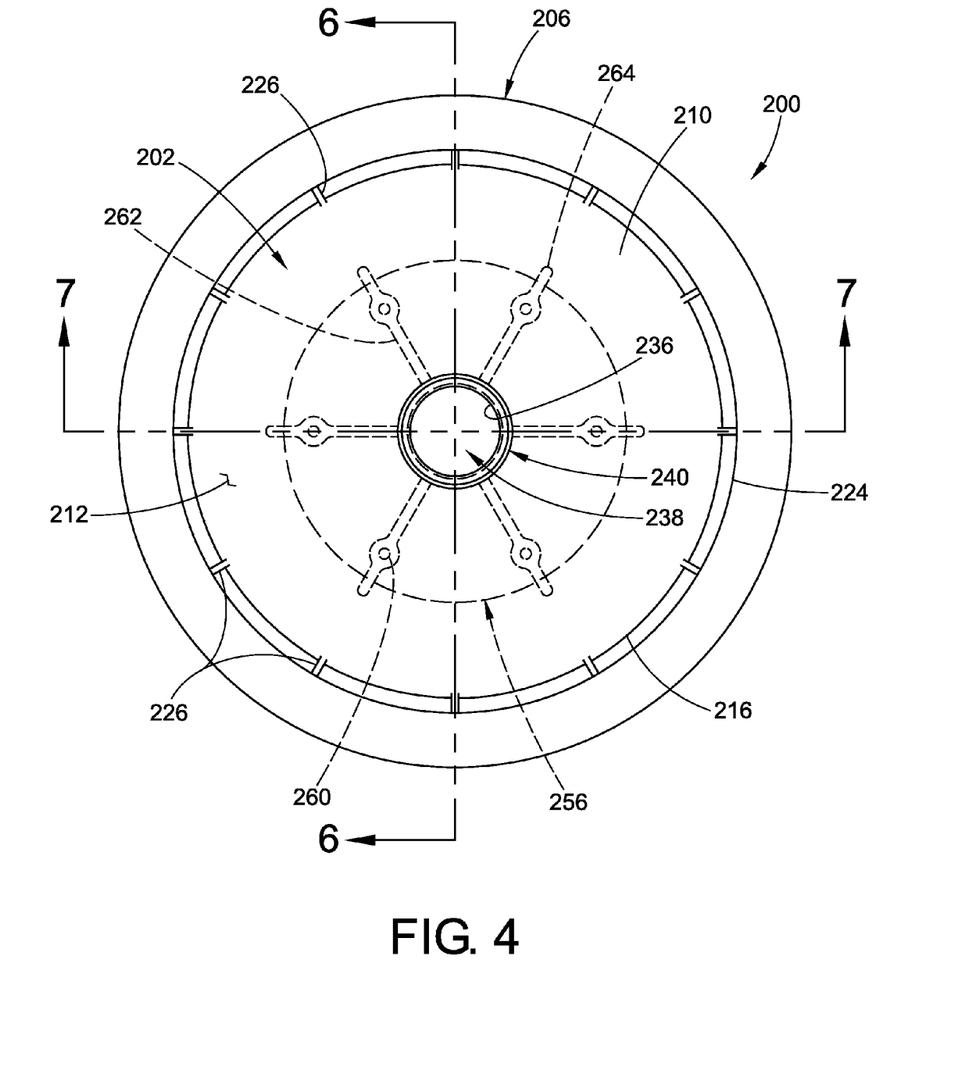
FIG. 4 is a top plan view of the exemplary gas spring assembly shown in FIG. 3.
Figure 6:
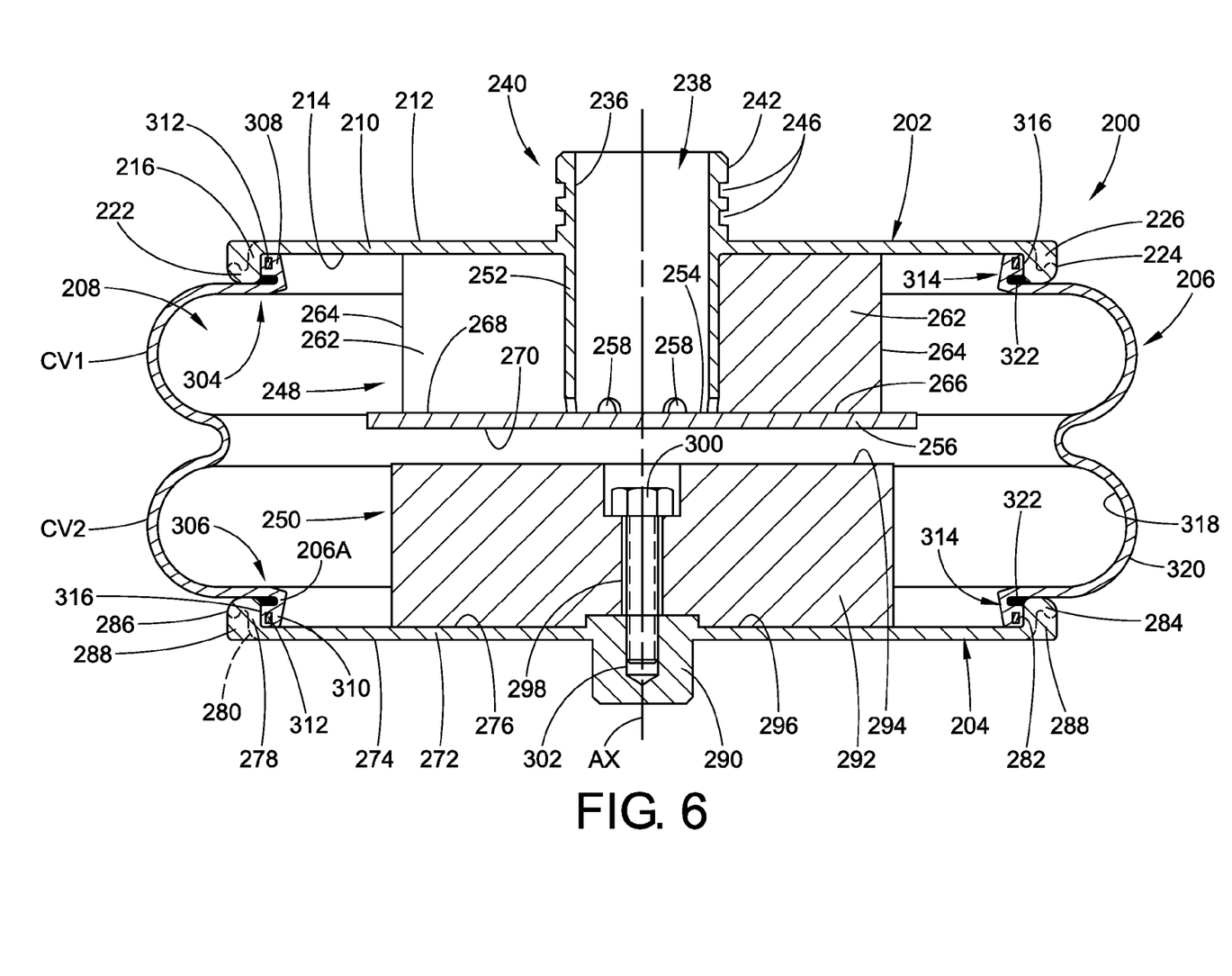
FIG. 6 is a cross-sectional side view of the exemplary gas spring assembly in FIGS. 3-5 taken from along line 6-6 in FIG. 4.
Figure 7:
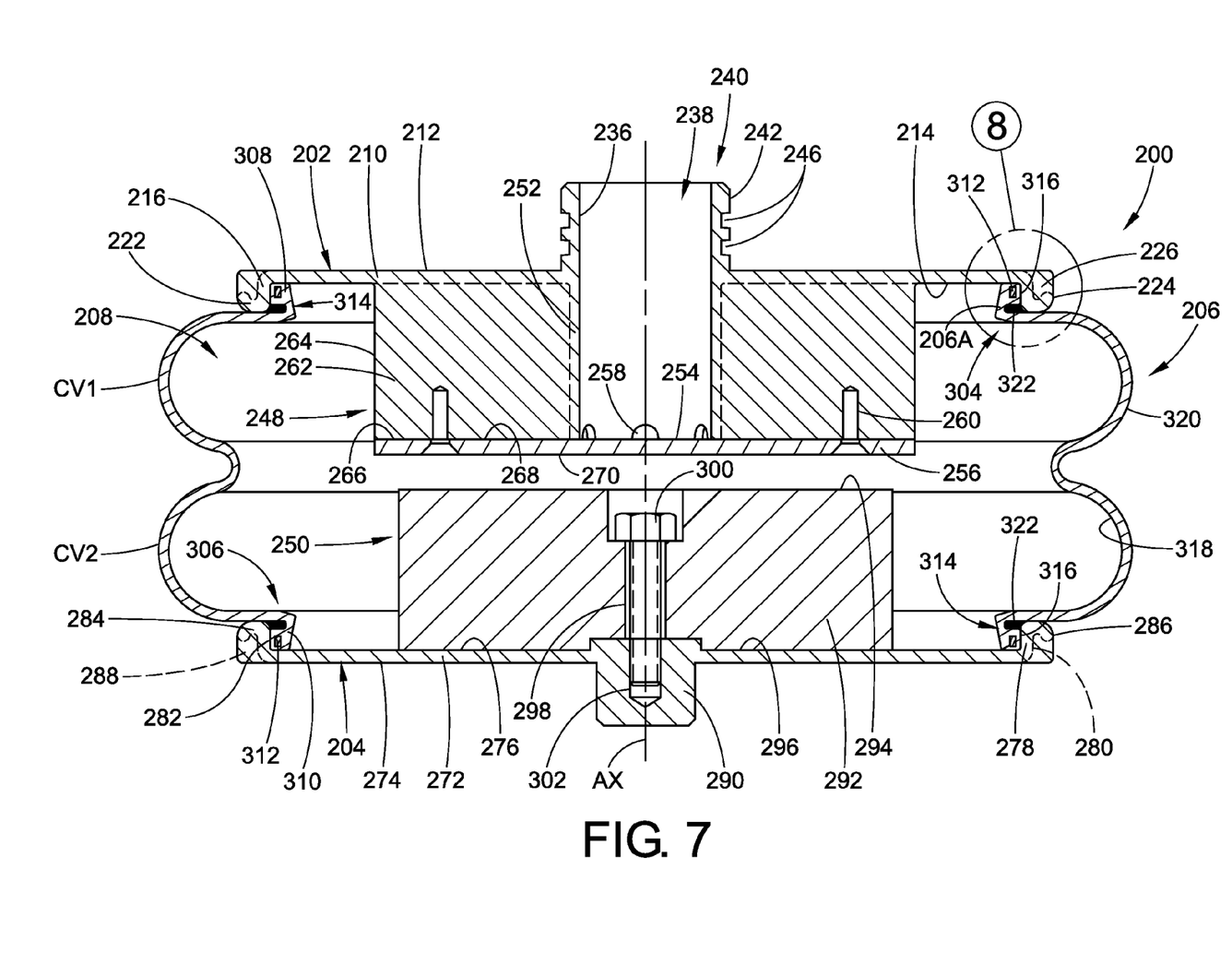
FIG. 7 is a cross-sectional side view of the exemplary gas spring assembly in FIGS. 3-6 taken from along line 7-7 in FIG. 4.

In some cases, gas spring assembly 200 can include an internal support structure, such as may be suitable for inhibiting contact between certain components and/or features of the gas spring assembly and/or the associated suspension system. Additionally, or in the alternative, the internal support structure may be constructed for use in supporting a vehicle body at a predetermined height during uninflated or other conditions of the gas spring assembly. It will be appreciated that such an internal support structure can be of any suitable type, kind, configuration and/or construction. One example of such as construction is shown in FIGS. 4, 6 and 7 as including a support structure 248 disposed along end member 202 and a bumper 250 disposed along end member 204. It will be appreciated that any other suitable features, components and/or constructions could additionally, or alternately, be used.

Support structure 248 is shown in FIGS. 4, 6 and 7 as including a central wall 252 that projects from plate wall 210 in a direction opposite projection 240 such that the central wall extends into spring chamber 208. Central wall 252 can extend peripherally at least partially around axis AX and longitudinally from along plate wall 210 toward a distal end 254. In some cases, central wall 252 can at the least partially define gas transfer passage 238 and, as such, can be in fluid communication with spring chamber 208 in any suitable manner. As one example, the central wall can have an open end disposed in spaced relation to the plate wall. In cases in which the central wall is closed along distal end 254, the central wall can include one or more openings or passages formed therethrough that permit fluid communication between the gas transfer passage and the spring chamber. One example of such an arrangement is shown in FIGS. 4, 6 and 7 in which an end plate 256 is secured along distal end 254 of central wall 252. In such case, central wall 252 can include one or more openings or recesses 258 that extend through the central wall and permit fluid communication between gas transfer passage 238 and spring chamber 208. It will be appreciated that the one or more openings or recesses can be of any suitable size, shape, configuration and/or arrangement.

End plate 256 can be secured on or along central wall 252 in any suitable manner. As one example, a flowed-material joint could be formed between the end plate and the central wall. As another example, end plate 256 can be secured on or along central wall 252 by way of one or more securement devices, such as one or more threaded fasteners (not shown) operatively engaging corresponding threaded passages 260, for example. If provided, such threaded passages can be positioned on or along any suitable wall or wall portion.

In some cases, one or more support walls can be provided that buttress or otherwise supportingly engage the end plate. As one example, a plurality of support walls 262 can extend radially outwardly from along central wall 252 to an outer edge 264. Additionally, support walls 262 can extend axially outwardly from along plate wall 210 toward a distal edge 266. In the arrangement shown in FIGS. 6 and 7, distal edges 266 of support walls 262 are disposed in abutting engagement with a surface 268 of end plate 256 such that forces and loads can be transferred or otherwise communicated between plate wall 210 and end plate 256 at least partially through the one or more of central wall 252 and support walls 262. End plate 256 also includes a surface 270 disposed opposite surface 268 that is dimensioned to abuttingly engage bumper 250.

In the exemplary arrangement in FIGS. 3-8, end member 204 is shown as taking the form of an end cap including a plate wall 272 that has an outer surface 274 and an inner surface 276 such that a plate height (not identified) is at least partially defined therebetween. Plate wall 272 is shown as being generally planar and extending outwardly to an outer side wall (or outer side wall portion) 278 that has an outer surface 280 and an inner surface 282. In some cases, plate wall 272 can have a generally circular shape such that an outer peripheral wall portion 284 can extend radially outward from along outer side wall 278 to an outer peripheral edge 286. In some cases, a plurality of support walls 288 can project radially-outwardly from along outer surface 280 of outer side wall 278 and interconnect with outer peripheral wall portion 284, such as adjacent outer peripheral edge 286, for example. It will be appreciated that outer peripheral wall portion 284 can, in some cases, be spaced axially from plate wall 272, and can include an end surface (not numbered) that can, in some cases, form a distal extent of at least the outer periphery of end member 204. Additionally, it will be appreciated that inner surface 282 can transition to the end surface (not numbered) in any suitable manner, such as has been described above in connection with end member 202 in FIGS. 8 and 9, for example.

Additionally, it will be appreciated that end member 204 can be secured on or along an associated structural component in any suitable manner. For example, end member 204 is shown as being secured on or along a structural component SC2, such as an associated rail bogie 104 in FIG. 1, for example. In the arrangement shown in FIG. 7, end member 204 includes a projection 290 that extends outwardly from along the end member and extends through a corresponding hole MHL in structural component SC2. In some cases, one or more securement devices (not shown) can, optionally, engage a corresponding one of a plurality of securement features (not shown) provided on or along end member 204, such as to retain the end member in abutting engagement with the structural component.

Jounce bumper 250 can be of any suitable size, shape, construction and/or configuration for inhibiting contact between certain components and/or features of the gas spring assembly and/or the associated suspension system, and/or for supporting a vehicle body at a predetermined height during uninflated or other conditions of the gas spring assembly. As one example, jounce bumper 250 can include a bumper body 292 that includes an end surface 294 dimensioned to abuttingly engage surface 270 of end plate 256. Bumper body 292 can also include an end surface 296 dimensioned to abuttingly engage inner surface 276 of plate wall 272. It will be appreciated that jounce bumper 250 can be secured on or along end member 204 in any suitable manner. As one example, a passage wall 298 can at least partially define a passage (not numbered) extending through bumper body 292. A securement device, such as a threaded fastener 300, for example, can extend through the passage and operatively engage a corresponding securement feature, such as a threaded hole 302, for example, formed on or along end member 204. In this manner, jounce bumper 250 can be secured along end member 204.

With further reference to FIGS. 3-9, flexible wall 206 can be of any suitable type, kind, construction and/or configuration. As one example, flexible wall 206 can be a convoluted bellows-type construction that includes one or more convolutions CV1 and CV2. It will be appreciated, however, that flexible walls of other types and/or constructions could alternately be used, such as a rolling lobe-type construction, for example. Flexible wall 206 can extend longitudinally between opposing ends 304 and 306, and can include mounting beads 308 and 310 that are respectively disposed along ends 304 and 306 of flexible wall 206. In a preferred arrangement, mounting beads 308 and 310 are constructed and dimensioned to form a substantially fluid-tight seal with an associated end member, such as a respective one of end members 202 and 204, for example. In some cases, a substantially-inextensible reinforcing element 312 can be at least partially embedded within either or both of mounting beads 308 and 310, such as is shown in FIGS. 6-9, for example.

Additionally, in some cases, either or both of mounting beads 308 and 310 can include a groove or slot 314 that extends annularly around axis AX. In some cases, the groove or slot can extend into the flexible wall adjacent either or both of the mounting beads. In other cases, the groove or slot can be at least partially formed by or in the transitional region 206A (FIGS. 8, 8A and 9) that extends between flexible wall 206 and either or both of mounting beads 308 and 310, such as is shown in FIGS. 6-9, for example. Mounting beads 308 and 310 can also include an outer peripheral surface 316 and an end surface 317 dimensioned for abutting engagement with one of inner surfaces 214, 220, 276 and/or 282. As such, in an assembled condition of gas spring assembly 200, outer peripheral surface 316 of one of mounting beads 308 and 310 can form a substantially fluid tight seal with a corresponding one of inner surfaces 214 and/or 220 and 276 and/or 282 of end members 202 and 204, respectively. Additionally, it will be appreciated that such an interconnection between a mounting bead and an end member can, in some cases, generate sufficient resistance to axially-applied tensile loads and/or forces to form a gas spring assembly in accordance with the subject matter of the present disclosure, such as gas spring assembly 200, for example.

As identified in FIGS. 6 and 7, flexible wall 206 can have an inner surface 318 that can at least partially define spring chamber 208 and an outer surface 320. Flexible wall 206 can include or can otherwise be at least partially formed from one or more filament-reinforced, elastomeric plies or layers (not shown) and/or one or more un-reinforced, elastomeric plies or layers (not shown), for example. Typically, one or more filament-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used. In some cases, the one or more filament-reinforced, elastomeric plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Additionally, one or more filament-reinforced, elastomeric plies can be oriented relative to one another in any suitable manner, such as, for example, by having the filaments of one ply disposed at one bias angle and the filaments of another ply disposed at a similar bias angle but extending in the opposing direction.

Figure 8A:
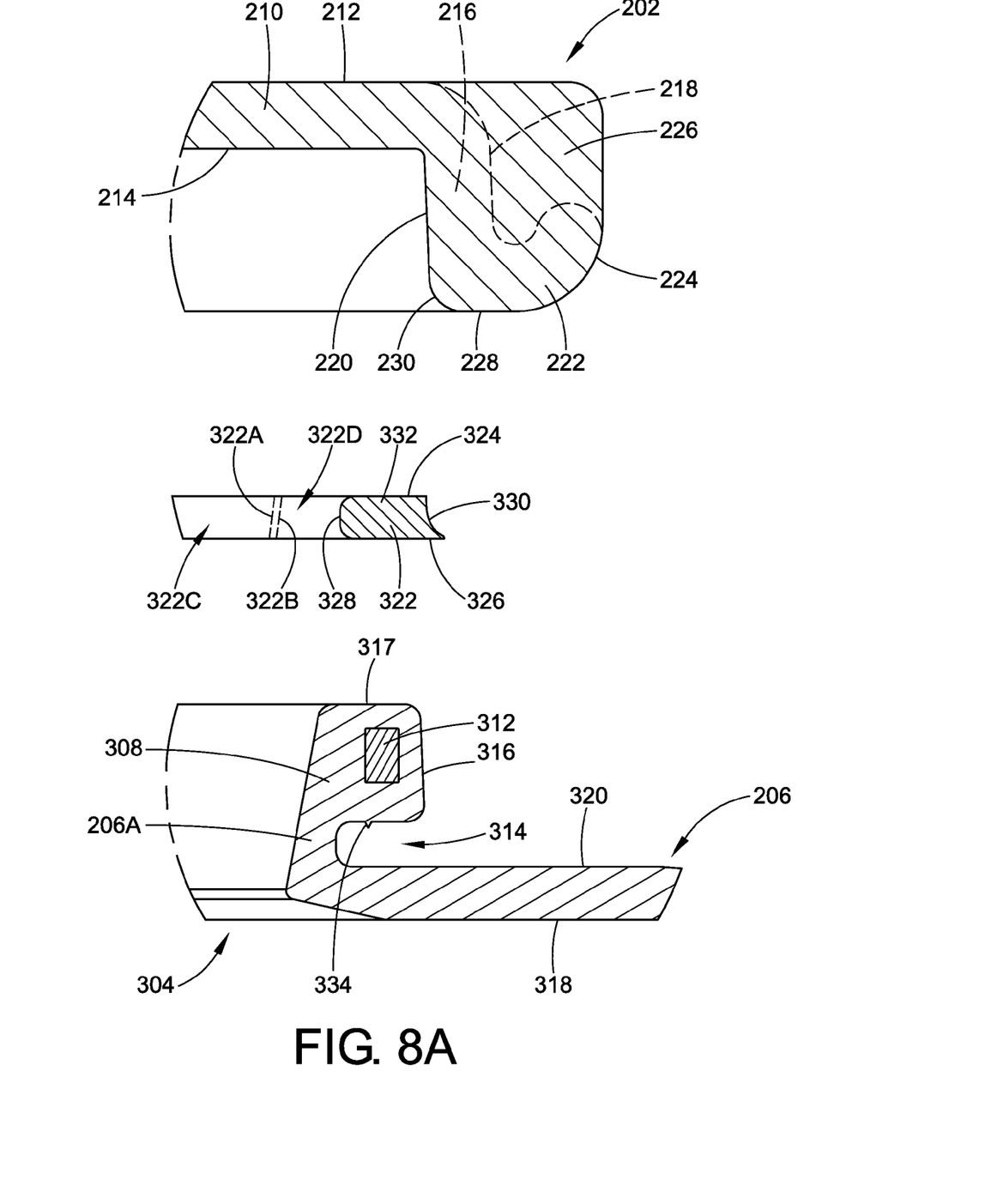
FIG. 8A is an exploded view of the portion of the exemplary gas spring assembly in FIG. 8 shown prior to assembly, as shown in FIGS. 3-7.

Gas spring assembly 200 also includes one or more compression cores 322 disposed within a corresponding one of grooves 314. Compression cores 322 can include opposing side surfaces 324 and 326 that are respectively disposed in abutting engagement with one of mounting beads 308 and 310 and outer surface 320 of flexible wall 206. In this manner, compression cores 322 can substantially entirely fill the void or cavity formed by groove 314. Compression cores 322 can be of any suitable size, shape, configuration and/or arrangement suitable for substantially filling the void or cavity formed by a groove in the flexible wall, such as one of grooves 314. In some cases, compression cores 322 can take the form of annular rings that may be split, as is represented by dashed lines 322A and 322B in FIG. 8A, or otherwise include opposing ring ends, as is represented in FIG. 8A by item numbers 322C and 322D. In such cases, the ring ends could be separated from one another to install or otherwise position the compression core around flexible wall 206 and within groove 314.

Additionally, compression cores 322 can, in some cases, include an inner peripheral surface or edge 328 and an outer peripheral surface or edge 330. In a preferred arrangement, outer peripheral edge 330 can have a cross-sectional profile or shape that is complimentary to a profile or shape of a corresponding wall portion of the associated end member, such as one of wall portions 230 and/or 232, for example. Additionally, transition regions 206A of flexible wall 206 can, in some cases, be disposed radially inward of the compression cores. In a preferred arrangement, at least a portion of transitional regions 206A can be disposed in abutting engagement with inner peripheral surface or edge 328 of compression cores 322.

In some cases, compression cores 322 can, optionally, include one or more locating features and/or elements suitable for receiving or otherwise interengaging a corresponding one or more locating features and/or elements of the flexible wall, transition regions and/or mounting beads. As one non-limiting example, compression cores 322 can include an annular groove 332 extending into the compression core from along side surface 324. In such case, mounting bead 308 and/or 310 can include an annular rib 334 projecting from the mounting bead in a direction toward flexible wall 206. In an assembled condition, rib 334 can be at least partially received within groove 332, such as may be used to locate and/or maintain the compression core in position relative to the mounting bead, for example.

It will be appreciated that compression cores 322 can be formed from any suitable material or combination of materials. As one example, the compression cores could be formed from a metal material, such as steel or aluminum, for example. As another example, the compression cores could be formed from a polymeric material, such as a thermoplastic or thermoset material. Non-limiting examples of suitable polymeric materials can include thermoplastic materials, such as glass or other fiber-reinforced polypropylene, glass or other fiber-reinforced polyamide, as well as high-strength (e.g., unfilled) polyester, polyethylene, polypropylene or other polyether-based materials, or any combination thereof. As a further example, the compression cores could be formed from an elastomeric material, such as natural rubber, synthetic rubber and/or thermoplastic elastomer. In a preferred arrangement, however, the compression core or cores will be formed from a material having a higher stiffness and/or hardness than the material of flexible wall 206 and/or mounting 308 and/or 310.

In use, it will be appreciated that the one or more compression cores, such as one or more of compression cores 332, for example, can assist in retaining the end of the flexible wall on or along an associated end member and/or can assist during assembly of a gas spring in accordance with the subject matter of the present disclosure, such as gas spring assembly 200, for example. For example, mounting bead 308 and/or 310 can be pressed or otherwise urged into abutting engagement with a corresponding one of end members 202 and/or 204. It will be appreciated that such pressing or urging can be accomplished in any suitable manner. As one example, end members 202 and/or 204 can be positioned and maintain in a substantially fixed relation to one another. A quantity of pressurized gas can be transferred into spring chamber 208 such that the pressurized gas acts on flexible wall 206 and urges the portions of the flexible wall along ends 304 and 306 axially outwardly toward end members 202 and 204. The portions of the flexible wall along ends 304 and 306 are disposed in abutting engagement with compression cores 322 such that the compression cores force or otherwise urge mounting beads 308 and/or 310 outwardly into abutting engagement with inner surfaces 220 and 282. In this manner, mounting beads 308 and/or 310 can be seated against the end members such that a substantially fluid tight seal is formed therebetween, such as is represented by arrows 332 in FIGS. 8 and 9.

Figure 10:
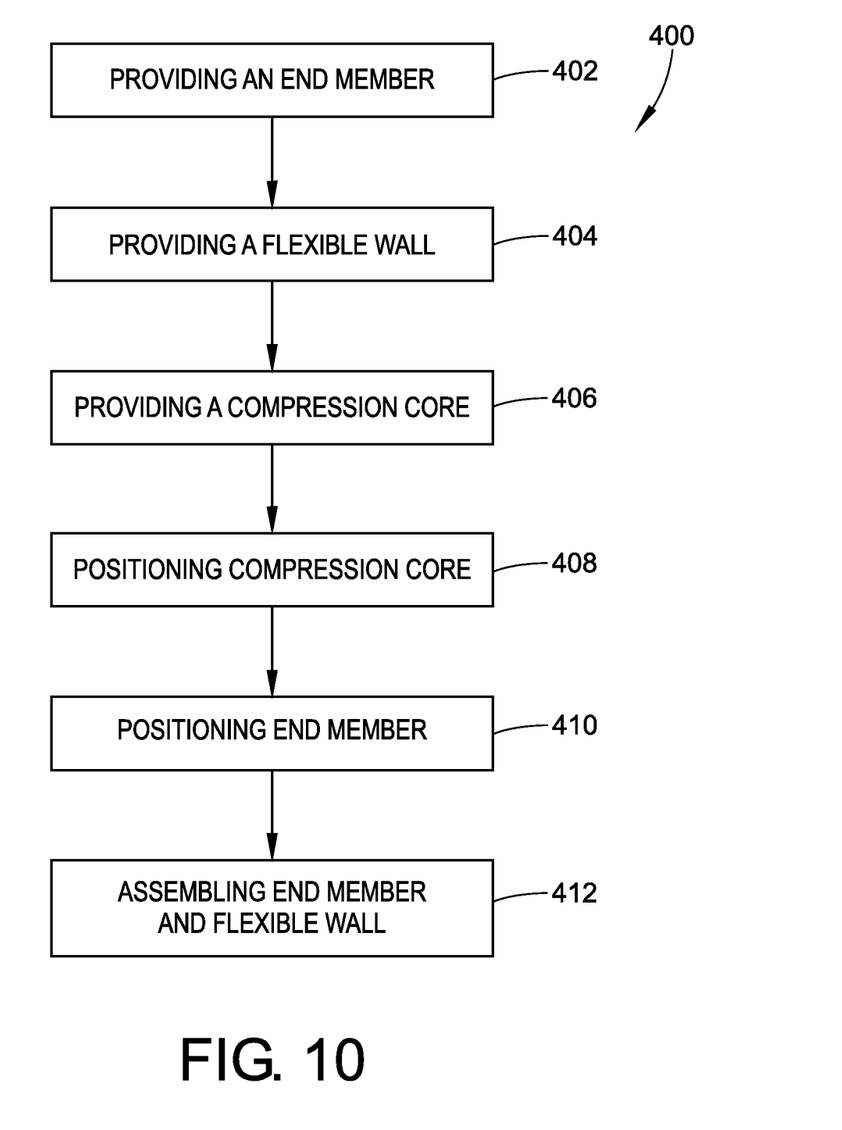
FIG. 10 is a graphical representation of one example of a method of assembling a gas spring assembly in accordance with the subject matter of the present disclosure.

One example of a method of assembly in accordance with the subject matter of the present disclosure is illustrated in FIG. 10, as is represented by item number 400. The method can include providing an end member, such as one or more of end members 202 and/or 204, for example, as is represented by item number 402. Method 400 can also include providing a flexible wall including one or more mounting beads with a groove formed therealong, such as one or more of mounting beads 308 and/or 310 of flexible wall 206, for example, as is represented by item number 404. Method 400 can further include providing one or more compression cores, such as one or more of compression cores 322, for example as is represented in FIG. 10 by item number 406.

Method 400 can also include positioning one or more compression cores within one or more grooves formed along a mounting bead of a flexible wall, as is represented by item number 408. Method 400 can further include positioning an end member on or along the mounting bead, as is represented by item number 410. Method 400 can also include assembling the end member and the flexible wall into abutting engagement with one another by pressing, urging or otherwise influencing a portion of the flexible wall and the one or more compression cores toward the mounting bead such that a substantially fluid tight seal is formed between the mounting bead and the associated end member, such as is represented in FIG. 10 by item number 412.

It will be appreciated that an end member in accordance with the subject matter of the present disclosure can be formed or otherwise manufactured from any suitable material or combination of materials. For example, end members 202 and/or 204 could be formed from a metal material, such as aluminum or steel, for example. In other cases, however, end member 202 and/or 204 can be formed from a non-metallic material, such as a thermoplastic or thermoset material, for example. Non-limiting examples of suitable non-metallic materials from which either or both of end members 202 and 204 can be formed include thermoplastic materials, such as glass or other fiber-reinforced polypropylene, glass or other fiber-reinforced polyamide, as well as high-strength (e.g., unfilled) polyester, polyethylene, polypropylene or other polyether-based materials, or any combination thereof.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A flexible wall and compression core assembly dimensioned for securement along an associated end member to at least partially form an associated gas spring assembly, the associated end member including an associated end wall and an associated side extending axially from along the associated end wall, said flexible wall and compression core assembly comprising:
   a flexible wall having a longitudinal axis and extending peripherally about said axis and longitudinally between opposing first and second ends with at least said first end including a first mounting bead formed therealong, said flexible wall and said first mounting bead being at least partially formed from a first elastomeric material, said first mounting bead including an end surface that is oriented transverse to said axis and faces away from said second end and an outer peripheral surface that extends peripherally about said axis and extends lengthwise along said axis in a direction away from said end surface of said first mounting bead, said end surface dimensioned to abuttingly engage the associated end wall of the associated end member and said outer peripheral surface dimensioned to abuttingly engage the associated side wall of the associated end member and thereby form a substantially fluid-tight seal between said outer peripheral surface of said first mounting bead and the associated side wall of the associated end member;
   a reinforcing element extending peripherally about said axis and embedded within said first mounting bead of said flexible wall; and,
   a compression core extending circumferentially about said longitudinal axis and disposed between said first mounting bead and a portion of said flexible wall adjacent said first mounting bead, said compression core formed from at least one of a metal material, a polymeric material and a second elastomeric material that is different from said first elastomeric material, and said compression core including an outer peripheral surface facing radially outward and being exposed for facing the associated side wall of the associated end member.

2. An assembly according to claim 1, wherein said first mounting bead is disposed in spaced apart relation to said portion of said flexible wall adjacent said first mounting bead such that an annular slot extends around said flexible wall, and said compression core is at least partially disposed within said annular slot.

3. An assembly according to claim 2, wherein said compression core includes a first side surface and a second side surface opposite said first side surface, said compression core disposed within said annular slot between said first mounting bead and said portion of said flexible wall adjacent said first mounting bead such that said first side surface is disposed in abutting engagement with said first mounting bead and said second side surface is disposed in abutting engagement with said portion of said flexible wall adjacent said first mounting bead.

4. An assembly according to claim 3, wherein said compression core includes a locating feature formed along one of said first and second side surfaces, and said flexible wall includes a corresponding locating feature disposed along one of said first mounting bead and said portion of said flexible wall adjacent said first mounting bead with said locating features of said compression core and said flexible wall interengaged with one another.

5. An assembly according to claim 2, wherein said flexible wall includes a transition region extending between said first mounting bead and said portion of said flexible wall adjacent said first mounting bead to form a radially-inward end of said annular slot, said compression core includes an inner peripheral surface spaced radially inward of said outer peripheral surface, and said compression core being at least partially received in said slot such that said inner peripheral surface is disposed in abutting engagement with said transition region of said flexible wall and said outer peripheral surface is disposed in abutting engagement with the associated side wall of the associated end member.

6. A rail spring assembly having a longitudinal axis and dimensioned for securement between associated sprung and unspring masses, said rail spring assembly comprising:
   a first end member including an end wall disposed transverse to said longitudinal axis and a side wall extending longitudinally away from said end wall, said side wall including an inner peripheral surface;
   a second end member disposed in longitudinally-spaced relation to said first end member;
   a flexible wall at least partially formed from a first elastomeric material extending peripherally about said longitudinal axis and axially between opposing first and second ends to at least partially define a spring chamber, said first end of said flexible wall including a first mounting bead formed therealong, said first mounting bead including an end surface oriented transverse to said longitudinally axis and an outer peripheral surface extending about said longitudinally axis, said first mounting bead disposed along said inner peripheral surface of said first end member such that a substantially fluid-tight seal is formed between said outer peripheral surface of said first mounting bead and said inner peripheral surface of said side wall of said first end member, said second end operatively connected to said second end member such that a substantially fluid-tight seal is formed therebetween;
   a first reinforcing element extending peripherally about said axis and embedded within said first mounting bead of said flexible wall; and,
   a first compression core extending circumferentially about said longitudinal axis and disposed between said first mounting bead and a first portion of said flexible wall adjacent said first mounting bead, said compression core formed from at least one of a metal material, a polymeric material and a second elastomeric material that is different from said first elastomeric material, said first compression core including an outer peripheral surface disposed in facing relation to said inner peripheral surface of said side wall of said first end member.

7. A rail spring assembly according to claim 6, wherein said first compression core includes said outer peripheral surface that has one of a curved cross-sectional profile and a linear cross-sectional profile.

8. A rail spring assembly according to claim 7, wherein said outer peripheral surface of said first compression core has a linear cross-sectional profile that at least partially forms one of a cylindrical and a frustoconical shape of said outer peripheral surface.

9. A rail spring assembly according to claim 6, wherein said first compression core is one of an endless annular ring and a split ring having opposing ends.

10. A rail spring assembly according to claim 6, wherein said first end member includes a shoulder surface projecting radially inward from along said side wall and at least partially forming an annular ridge dimensioned to engage and at least partially retain said first mounting bead in engagement with said first end member.

11. A rail spring assembly according to claim 6, wherein said flexible wall includes a second mounting bead disposed along said second end and said assembly further comprises a second reinforcing element and a second compression core, said second reinforcing element extending peripherally about said axis and embedded within said second mounting bead, and said second compression core disposed between said second mounting bead and a second portion of said flexible wall adjacent said second mounting bead.

12. A rail spring assembly according to claim 11, wherein said second end member includes an end wall disposed transverse to said longitudinal axis and a side wall extending longitudinally away from said end wall with said side wall including an inner peripheral surface dimensioned to receivingly engage at least a portion of said second mounting bead and said second compression core.

13. A rail spring assembly according to claim 6, wherein said first mounting bead is disposed in spaced apart relation to said first portion of said flexible wall such that an annular slot extends around said flexible wall with said first compression core at least partially disposed within said annular slot.

14. A rail spring assembly according to claim 13, wherein said first compression core includes a first side surface and a second side surface opposite said first side surface, said first compression core disposed within said annular slot between said first mounting bead and said first portion of said flexible wall adjacent said first mounting bead such that said first side surface is disposed in abutting engagement with said first mounting bead and said second side surface is disposed in abutting engagement with said first portion of said flexible wall adjacent said first mounting bead.

15. A rail spring assembly according to claim 13, wherein said flexible wall includes a first transition region extending between said first mounting bead and said first portion of said flexible wall adjacent said first mounting bead to form a radially-inward end of said annular slot, said compression core includes an inner peripheral surface disposed radially inward of said outer peripheral surface, and said compression core is at least partially received in said annular slot such that said inner peripheral surface is disposed in abutting engagement with said first transition region of said flexible wall.

16. A suspension system comprising:
pressurized gas system; and,
at least one rail spring assembly according to claim 6 with said spring chamber disposed in fluid communication with said pressurized gas system such that pressurized gas can be transferred into and out of said spring chamber.

17. A method of assembling a rail spring, said method comprising:
providing a flexible wall that has a longitudinal axis and extends peripherally about said longitudinal axis and axially between opposing first and second ends such that said flexible wall can at least partially define a spring chamber, said flexible wall including a first mounting bead disposed along said first end, said first mounting bead including an end surface oriented transverse to said longitudinal axis and an outer side surface extending longitudinally away from said end surface;
providing an annular compression core having an outer peripheral surface and positioning said compression core along the exterior of said flexible wall in abutting engagement with said first mounting bead such that said outer peripheral surface is outwardly exposed along said first mounting bead;
providing a first end member having an end wall disposed transverse to said longitudinal axis and a side wall extending longitudinally away from said end wall, said side wall including an inner peripheral surface;
positioning said first mounting bead and said compression core adjacent said inner surface of said side wall of said first end member;
urging said first end member and said first mounting bead together with said compression core in an axial direction toward one another such that said outer side surface of said first mounting bead and said outer peripheral surface of said compression core abuttingly engage said inner surface of said side wall of said first end member and thereby at least partially secure said first end member along said first end of said flexible wall with a substitute fluid-tight seal formed therebetween; and,
providing a second end member and securing said second end member along said second end of said flexible wall.

18. A method according to claim 17, wherein positioning said first mounting bead and said compression core includes capturing said compression core between said first mounting bead and a portion of said flexible wall adjacent said first mounting bead.

19. A method according to claim 17, wherein urging said first mounting bead and said compression core includes inflating said spring chamber using pressurized gas and thereby displacing said first mounting bead and said compression core toward said first end member.

20. A method according to claim 19, wherein urging said first mounting bead and said compression core includes maintaining said first end member in a substantially fixed position such that said first mounting bead and said compression core are displaced relative to said inner surface of said side wall of said first mounting bead.

* * * * *